Patented Mar. 7, 1939

2,149,379

UNITED STATES PATENT OFFICE 2,149,379

PROCESS FOR REMOVING ACID COMPONENTS FROM HYDROCARBON SOLUTIONS

David Louis Yabroff, Berkeley, and Ellis R. White, Albany, Calif., assignors to Shell Development Company, San Francisco, Calif., a corporation of Delaware No Drawing. Application January 2, 1937, Serial No. 118,920

7 Claims. (Cl. 196—32)

This invention relates to the removal of weakly acid-reacting organic substances from solutions in organic liquids of the type of hydrocarbons, and in particular deals with the removal of mercaptans from petroleum distillates.

It is frequently necessary to eliminate small quantities of organic acidic components such as mercaptans and phenols, etc. from their solutions in substantially neutral hydrocarbon type liquids. The term, hydrocarbon type liquids, as herein used, refers to hydrophobe normally liquid organic substances which are neutral or slightly basic, such as the liquid hydrocarbons derived from petroleum, benzene, toluene, xylene, substituted normally liquid hydrocarbons which are substantially insoluble in water, for instance, chlorinated hydrocarbons, of which chlorethane, ethylene dichloride, trichlorethylene, carbon tetrachloride, chlorpropane, chlorbutylene, chlorbenzene, brombenzene, are examples; or nitro hydrocarbons, for example, nitroethane, nitrobenzene; or other nitrogen containing hydrocarbons such as amyl or higher amines, aniline, pyridine, petroleum bases, etc.

In the U. S. Patent 2,059,075 by Yabroff and Givens it was shown that the efficacy of the removal of acidic organic substances from their solution in hydrocarbon type liquids by means of alkaline-reacting solutions which are substantially immiscible with said liquids, depends largely on the solvent power of the alkaline solution for the organic acids and on the alkalinity of the former. As a means for producing aqueous alkaline solutions of good solvent power for organic acids the use of quaternary ammonium bases was suggested. The addition of certain polyhydroxy alcohols, amino alcohols, and diamines to aqueous alkali hydroxide to increase the solvent power of the latter was disclosed in the pending applications Serial Nos. 102,892 and 102,893, filed September 28, 1936, by Yabroff.

Now we have discovered that the alkali salts of certain lower fatty acids have the ability of increasing the extraction power of aqueous alkali toward organic acids to a remarkable degree by virtue of the combination of two properties, namely high solubility in aqueous caustic alkali and high solubility enhancing effect.

The terms alkali, alkali hydroxide, or caustic alkali refer to all strongly alkaline bases, i. e., the alkali metal and ammonium hydroxides, alkaline earth hydroxides, quaternary ammonium bases, alkaline reacting carbonates and bicarbonates, etc., although the hydroxides of the alkali metals are preferred. Especially useful are the sodium and potassium hydroxides, as being the strongest of the easily available bases. While sodium hydroxide is more generally used because of its lower cost, potassium hydroxide is usually considered more effective.

The salts which are used according to this invention are the alkali salts of the acids having from 3 to 5 carbon atoms, the most outstanding salt being the isobutyrate.

Solubility enhancing effect increases with the concentration of the solubility promoter salt as well as with the strength of the caustic alkali. In the table below this effect is demonstrated. A solution of normal amyl mercaptan in iso-octane was treated in a single stage with various aqueous sodium hydroxide solutions containing different amounts of sodium isobutyrate, and the tabulated data represent the partition coefficients $K$ for n-amyl mercaptan between the aqueous sodium hydroxide and iso-octane, $K$ being the concentration of the mercaptan dissolved as a mercaptide in the aqueous caustic phase divided by its concentration in the hydrocarbon phase.

TABLE I $K$ values for n-amyl mercaptan in isooctane and various concentrations of NaOH

| Grams Na-isobutyrate in 100 milliliters in caustic | 2.0 N NaOH | 3.5 N NaOH | 5.0 N NaOH |
|---|---|---|---|
| 0 | 1.30 | 1.20 | 1.0 |
| 10 | 1.35 | 1.45 | 2.5 |
| 20 | 1.80 | 5.5 | 15 |
| 30 | 4.7 | 18 | 51 |
| 40 | 15.5 | 52 | 110 |

From the above data the importance of high solubility of the fatty acid salt in strong aqueous caustic is realized, since highest extraction efficiency can be obtained only by the combination of high alkalinity and high fatty acid salt content. The solubilities of some typical fatty acid salts in 5 N-aqueous sodium hydroxide are as follows:

TABLE II

Solubilities of salts in 5 N-caustic soda

| Salt | Solubility grams per 100 milliliters |
|---|---|
| Sodium acetate | 20 |
| Sodium propionate | 30 |
| Sodium butyrate | 28 |
| Sodium isobutyrate | 45 |
| Sodium valerate | 11 |
| Sodium trimethyl acetate | 12 |
| Sodium caproate | 6.7 |

Potassium salts, being somewhat more soluble in aqueous caustic alkali, are in general capable of giving better extraction results. The greater solubilities of the potassium salts is particularly marked in sodium hydroxide solutions rather than in potassium hydroxide solutions.

Superimposed on the combined effects of concentration of the caustic alkali and salt on the extraction efficiency, is the effect of the fatty acid radical, the higher fatty acid radical being more effective for a given unit weight than the lower radical. For instance, the K values for normal amyl mercaptan dissolved in iso-octane, when extracted with solutions of 20 grams of various fatty acid salts in 100 milliliters of 2.5 N-aqueous caustic, were found to be as follows:

TABLE III

*Effect of the acid radical size on K values*

| Number of C atoms in fatty acid salt | K values for n-amyl mercaptan |
| --- | --- |
| 2 | 1.0 |
| 3 | 1.6 |
| 4-iso | 2.6 |
| 5-n | 4.2 |
| 6-n | 9.0 |

The maximum K values which can be reached with any one fatty acid salt depend upon the optimum combination of its solubility and concentration of the alkali hydroxide. Fatty acid salts of less than 3 carbon atoms having low solubility enhancing effects, have relatively low maximum K values which compare unfavorably with other solutizers which have been disclosed in other applications; and fatty acid salts of more than 5 carbon atoms, although possessing favorable solubility enhancing properties, are insufficiently soluble in aqueous caustic alkali to exercise a solubility enhancing effect of practical value. Moreover, fatty acid salts of about 10 and more carbon atoms are likely to produce stubborn emulsions, a difficulty which is not encountered when using lower fatty acids.

Maximum K values for n-amyl mercaptan between iso-octane and 5 N sodium hydroxide saturated with alkali metal salts of the various fatty acids, are shown in Table IV below.

TABLE IV

*Maximum K values for n-amyl mercaptan and different solubility promoters*

| Salt | Number of C atoms in salt | Solubility of salt in 5 N NaOH grams /100 cc. | K for n-amyl mercaptan |
| --- | --- | --- | --- |
| None | 0 | | 1.0 |
| Na-acetate | 2 | 20 | 1.3 |
| Na-propionate | 3 | 30 | 15.5 |
| Na-n-butyrate | 4 | 28 | 16 |
| Na-isobutyrate | 4 | 45 | 140 |
| K-isobutyrate | 4 | 50 | 210 |
| Na-n-valerate | 5 | 14 | 8 |
| Na-trimethyl acetate | 5 | 12 | 8.5 |
| Na-n-caproate | 6 | 6.7 | 4.5 |

In one particular case, a California gasoline distillate boiling from 150° to 200° C. containing .076% mercaptan sulfur was extracted with 20% by volume of a 5 normal sodium hydroxide solution containing 40 grams sodium isobutyrate per 100 milliliters of solution in a 3-stage countercurrent extractor. The mercaptan sulfur was reduced to .001%, while an aqueous caustic alkali solution containing no isobutyrate reduced the mercaptan content under similar conditions to .03% only.

Although the solubilities of the fatty acid salts increase with increasing temperatures, the application of elevated temperatures for extraction offers few advantages, if any, because the extraction power of solutized caustic for weak acids, such as mercaptans, decreases with increasing temperatures. Therefore, I usually prefer to operate at temperatures between about 0 to 60° C.

While in comparison with some of the solutizing agents disclosed in the earlier applications hereinbefore referred to, the fatty acid salts are slightly inferior as far as their solutizing powers are concerned, they have the great advantage of being fully insoluble in hydrocarbon type liquids in contrast to the polyhydroxy alcohols, amino alcohols, and diamines, which are slightly soluble therein. Thus, losses of the fatty acid salts from this source are non-existing.

Moreover, the salts are not volatile, which facilitates the recovery of the spent caustic by steaming, since no losses of the fatty acid salt by vaporization can occur. Steaming can be carried out simply by blowing steam through the spent caustic alkali containing solubility promoter solution, which may be maintained as a pool or by flowing it downward through a suitable tower in counter current to the ascending steam, or in any other suitable manner. The used steam, which after passage through the spent caustic alkali solution carries with it mercaptans, need not be carefully fractionated as in the case of volatile solubility promoters, since it contains no solubility promoter.

The removal of mercaptans from the spent caustic alkali for the purpose of regenerating same must be carried as far as is economically feasible, because a retention of mercaptans in the regenerated caustic alkali greatly lessens its extracting power. For instance, upon extracting the afore mentioned California gasoline distillate which contains .076% mercaptan sulfur, with 10% by volume of a 5-normal sodium hydroxide solution containing 40 grams isobutyrate per 10 milliliters solution and various amounts of mercaptides, in a 3-stage countercurrent extractor, the mercaptan sulfur of the distillate was reduced as follows:

TABLE V

*Effect of mercaptides in the caustic alkali containing solubility promoter on mercaptan removal*

| Initial mercaptide sulfur in caustic, mols/liter | Mercaptan sulfur in distillate after extraction |
| --- | --- |
| 0 | 0.002 |
| .05 | .008 |
| .10 | .011 |
| .20 | .016 |

Methods for the regeneration of the spent caustic alkali containing solubility promoter or for the recovery of the solubility promoter depend largely upon the type of acids which were absorbed. If mercaptans only have been absorbed, the spent caustic alkali solution can be regenerated effectively by steaming. Under some circumstances, oxidation methods may be used to convert the mercaptides to disulfides.

In order to render the caustic alkali regenerable and to permit its continued recirculation without substantial deterioration, we usually pretreat the hydrocarbon type liquid containing mercaptans and stronger acids in a suitable manner to remove the stronger acids, as by washing with water to remove acetic acid and the like, scrubbing it with a caustic alkali free from solubility promoters solution or with a solution of tripotassium phosphate or the like to remove hydrogen sulfide, and/or fractionally distilling it, and thereafter subjecting the pretreated liquid to the treatment hereinbefore described.

We claim as our invention:

1. In the process of separating organic acid-reacting substances contained in a water-insoluble neutral or basic organic liquid the steps comprising treating said liquid with an aqueous solution of a strong alkaline base containing a substantial amount of dissolved salt of a fatty acid having from 3 to 5 carbon atoms under conditions to absorb at least a portion of said acid-reacting substances in said aqueous solution and to form two liquid layers, one comprising the aqueous solution containing absorbed acid-reacting substances and the other consisting essentially of the treated organic liquid, and separating the layers.

2. The process of claim 1 in which the fatty acid salt is an isobutyrate.

3. The process of claim 1 in which the fatty acid salt is a salt of an alkali metal.

4. The process of claim 1 in which the aqueous caustic is substantially saturated with the fatty acid salt.

5. In the process of separating mercaptans from sour hydrocarbon oil by treating same with an aqueous alkali metal hydroxide solution, the improvement comprising subjecting said oil to a treatment with an aqueous solution of alkali metal hydroxide which is substantially saturated with a fatty acid salt having from 3 to 5 carbon atoms, under conditions to absorb at least a portion of said mercaptans in the alkali metal hydroxide solution thereby forming mercaptides, and to form two layers, one comprising the aqueous solution of alkali metal hydroxide containing fatty acid salt and mercaptides and the other consisting essentially of treated hydrocarbon oil, and separating the layers.

6. In the process of separating mercaptans from a sour hydrocarbon oil by treating same with an aqueous alkali metal hydroxide solution, the improvement comprising subjecting said oil to a treatment with an aqueous solution of sodium hydroxide which contains about 40 grams sodium isobutyrate per 100 milliliters solution under conditions to absorb at least a portion of the mercaptans in the sodium hydroxide solution, thereby forming mercaptides, and to form two layers, one comprising the aqueous sodium hydroxide solution containing the isobutyrate and mercaptides and the other consisting essentially of treated oil, and separating the layers.

7. The process of claim 1 in which the fatty acid salt is a sodium salt.

DAVID LOUIS YABROFF.
ELLIS R. WHITE.